United States Patent
Hannemann et al.

(10) Patent No.: US 11,590,440 B2
(45) Date of Patent: Feb. 28, 2023

(54) PRODUCTION OF A POROUS ALUMINUM FILTER FOR A DIAPHRAGM PUMP

(71) Applicant: Dipl. Ing. Ernst Schmitz GmbH & Co. KG Maschinen und Apparatebau, Toenisvorst (DE)

(72) Inventors: Frank Hannemann, Roettenbach (DE); Sebastian Rahm, Dresden (DE); Marcus Weder, Bannewitz OT Haenichen (DE)

(73) Assignee: Dipl. Ing. Ernst Schmitz GmbH & Co. KG Maschinen and Apparatebau, Toenisvorst (DE)

( * ) Notice: Subject to any disclaimer, the term of this patent is extended or adjusted under 35 U.S.C. 154(b) by 14 days.

(21) Appl. No.: 17/388,470

(22) Filed: Jul. 29, 2021

(65) Prior Publication Data

US 2021/0354066 A1    Nov. 18, 2021

Related U.S. Application Data

(62) Division of application No. 16/327,586, filed as application No. PCT/EP2017/071073 on Aug. 22, 2017, now abandoned.

(51) Int. Cl.
*B01D 39/20* (2006.01)

(52) U.S. Cl.
CPC ...... *B01D 39/2051* (2013.01); *B01D 2239/10* (2013.01); *B01D 2239/1216* (2013.01)

(58) Field of Classification Search
CPC ............... B01D 39/2051; B01D 39/10; B01D 39/1216; F16K 11/20; F04B 43/02;
(Continued)

(56) References Cited

U.S. PATENT DOCUMENTS 3,138,856 A    6/1964   Kuchek
4,180,353 A   12/1979   Geidies
(Continued)

FOREIGN PATENT DOCUMENTS

DE    427455 C    4/1926
DE    449676 C    9/1927
(Continued)

OTHER PUBLICATIONS

International Search Report of PCT/EP2017/071089, dated Nov. 17, 2017.
(Continued)

*Primary Examiner* — Robert A Hopkins
*Assistant Examiner* — Qianping He
(74) *Attorney, Agent, or Firm* — Collard & Roe, P.C.

(57) ABSTRACT

A method produces a porous, arched aluminum fluidization element for a diaphragm pump for fluidizing, covering and delivering pulverized products, such as pulverized coal, using inert gas at pressures of up to 7 MPa. The fluidization element ensures that fluidizing gas is supplied and homogeneously distributed in the pump lower region, and the contour of the space for pulverized materials may be advantageously designed in the diaphragm deflection area and optionally adapted to the diaphragm guide rod. In this way, a homogeneous and reversible deformation of the diaphragm is obtained with minor wear as far as possible. At the end of the delivery process of the diaphragm pump, the diaphragm is applied to the arched, half-shell-shaped fluidization surface in an extensively flat manner, and a small dead volume can be obtained, which results in minimal space for pulverized materials with a high delivery rate and little high-pressure gas loss.

4 Claims, 1 Drawing Sheet

(58) Field of Classification Search
CPC ....... F04B 43/00; F04B 43/0054; A61M 1/16; A61M 1/1601
USPC ...................................... 29/423; 47/384, 386
See application file for complete search history.

(56) References Cited

U.S. PATENT DOCUMENTS

| | | | |
|---|---|---|---|
| 4,281,946 | A | 8/1981 | Kanics |
| 4,818,191 | A | 4/1989 | Schlake |
| 6,447,216 | B1 | 9/2002 | Higuchi et al. |
| 6,464,474 | B2 | 10/2002 | Schluecker |
| 6,796,215 | B1 | 9/2004 | Hauser et al. |
| 7,607,398 | B2 | 10/2009 | Tietze et al. |
| 8,851,406 | B2 | 10/2014 | Sonwane et al. |
| 9,138,672 | B2 * | 9/2015 | Ehrich .................... F23C 10/20 |
| 9,347,444 | B2 | 5/2016 | Nettesheim et al. |
| 2007/0065308 | A1 | 3/2007 | Yamamoto et al. |
| 2007/0074643 | A1 | 4/2007 | Tietze et al. |
| 2010/0021247 | A1 | 1/2010 | Aldred et al. |
| 2011/0100274 | A1 | 5/2011 | Kuske et al. |
| 2011/0155662 | A1 | 6/2011 | Liu et al. |
| 2012/0122042 | A1 | 5/2012 | Brueggemann |
| 2014/0037466 | A1 | 2/2014 | Nettesheim et al. |
| 2014/0112802 | A1 * | 4/2014 | Hannemann ............ F04B 43/06 417/474 |

FOREIGN PATENT DOCUMENTS

| | | |
|---|---|---|
| DE | 485635 C | 11/1929 |
| DE | 551066 C | 5/1932 |
| DE | 568999 C | 1/1933 |
| DE | 596565 C | 5/1934 |
| DE | 615779 C | 7/1935 |
| DE | 650988 C | 10/1937 |
| DE | 656009 C | 1/1938 |
| DE | 1008201 B | 5/1957 |
| DE | 1175653 B | 8/1964 |
| DE | 81606 A1 | 4/1971 |
| DE | 2722931 A1 | 11/1978 |
| DE | 147188 A3 | 3/1981 |
| DE | 3035745 A1 | 5/1982 |
| DE | 3909800 A1 | 9/1990 |
| DE | 10 2005 047 583 A1 | 4/2007 |
| DE | 102008007033 A1 | 8/2009 |
| DE | 102008009679 A1 | 8/2009 |
| DE | 102008049542 A1 | 4/2010 |
| DE | 102008052673 A1 | 4/2010 |
| DE | 102009016191 A1 | 10/2010 |
| DE | 102008049542 B4 | 12/2011 |
| DE | 10 2011 007 066 A1 | 10/2012 |
| DE | 102011052432 A1 | 10/2012 |
| DE | 102009016191 B4 | 4/2013 |
| DE | 10 2012 216 084 A1 | 3/2014 |
| DE | 202007019632 U1 | 1/2015 |
| DE | 10 2014 212 919 A1 | 1/2016 |
| DE | 10 2016 201 182 A1 | 7/2017 |
| EP | 0 732 501 A1 | 9/1996 |
| EP | 1 134 414 A2 | 9/2001 |
| GB | 2004993 A | 4/1979 |
| WO | 92/19866 A1 | 11/1992 |
| WO | 01/14744 A1 | 3/2001 |
| WO | 2009095290 A2 | 8/2009 |
| WO | 2009095290 A3 | 8/2009 |
| WO | 2010037601 A1 | 4/2010 |

OTHER PUBLICATIONS

International Search Report of PCT/EP2017/071073, dated Dec. 6, 2017.
International Search Report of PCT/EP2017/071066, dated Dec. 5, 2017.
Industriepumpen + Kompressoren, "Prozesspumpen mit zustandsüberwachter redundanter Schlauchmembran-Einspannung" (with English translation of title page and Abstract of article) Industry pumps + Compressors: Magazine for the praxis of pump and compressor technique, "Process pumps with condition-watched redundant hose membrane gripping," by Heinz M. Naegel, 16 year, brochure 3, 2010, pp. 120-123.
International Search Report dated May 2, 2017, for PCT/EP2016/081838.
Sigma-Aldrich, Particle Size Conversion Table, 2007-2008, Lab-Basics Technical Library (Year: 2007).

* cited by examiner

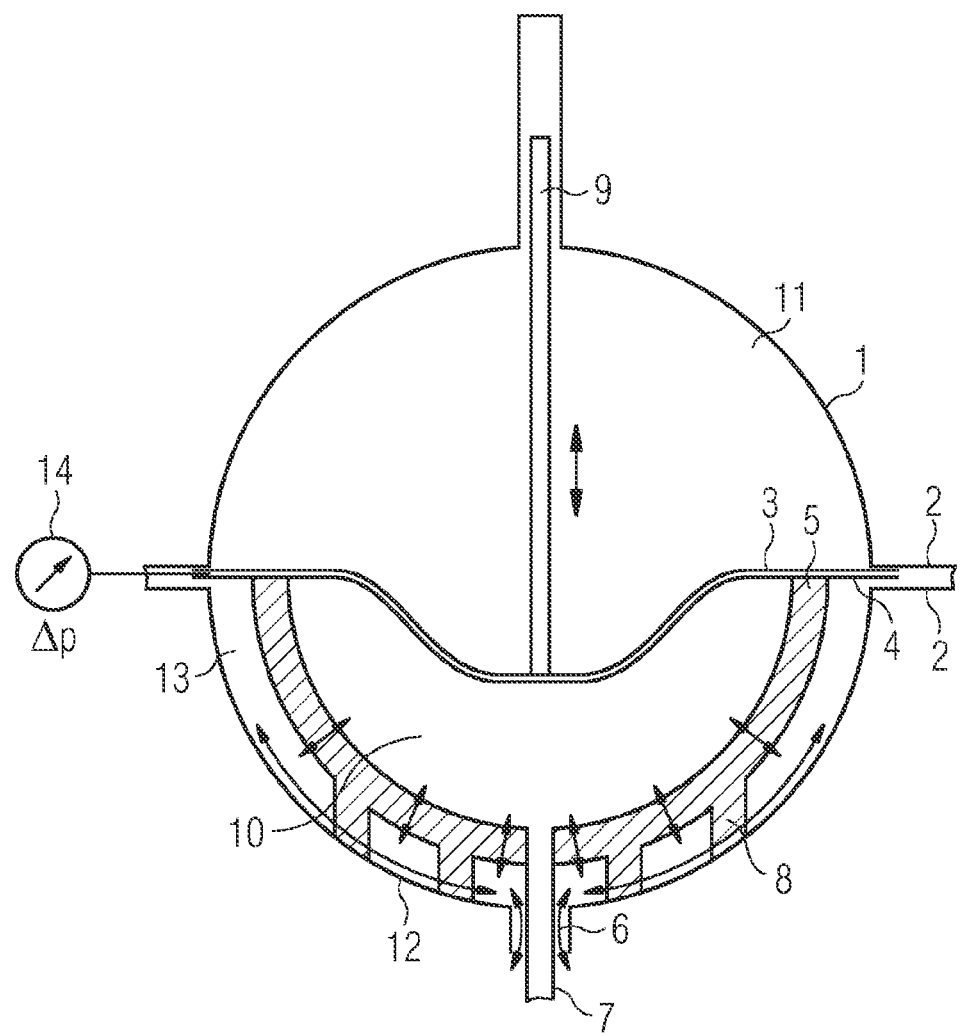

PRODUCTION OF A POROUS ALUMINUM FILTER FOR A DIAPHRAGM PUMP

CROSS REFERENCE TO RELATED APPLICATIONS

This application is a divisional of and Applicant claims priority under 35 U.S.C. §§ 120 and 121 of U.S. patent application Ser. No. 16/327,586 filed Mar. 5, 2019, which application is a national stage application under 35 U.S.C. § 371 of PCT Application No. PCT/EP2017/071073 filed Aug. 22, 2017, which claims priority under 35 U.S.C. § 119 from German Patent Application No. 10 2016 216 016.8 filed Aug. 25, 2016, the disclosures of each of which are hereby incorporated by reference. A certified copy of priority German Patent Application No. 10 2016 216 016.8 is contained in parent U.S. patent application Ser. No. 16/327,586. The International Application under PCT article 21(2) was not published in English.

BACKGROUND OF THE INVENTION

1. Field of the Invention

The invention relates to a method for producing a gas-permeable body which is formed with aluminum, and to a gas-permeable aluminum body produced in accordance with said method.

A body produced in accordance with the method according to the invention can be advantageously used as a loosening surface in a diaphragm pump for the fluidizing and charging of products in dust form, such as for example coal dust, by means of inert gas at pressures of up to 7 MPa as a filter element.

2. Description of the Related Art

Continuous and inexpensive dense-stream conveying in the case of fluctuating dust quality of dusts for combustion for carbon and biomass gasification plants is of increasing importance in order, for example, to operate gasification plants economically and with high availability. This aim is achieved in a particular manner using a diaphragm pump as proposed in the patent application DE102016201182 of Jan. 27, 2016. The material for conveying in dust form is in this case drawn into the diaphragm pump from below, is charged and fluidized in a subsequent step, and is subsequently conveyed out under pressure. The residual gas volume in the dust chamber of the diaphragm pump is expanded in a final step after the material for conveying has been conveyed out, and the pump cycle begins again. Owing to this cyclic (discontinuous) mode of operation, it is normally the case that multiple pump heads are connected together in order to ensure continuous operation. For this purpose, the individual pump cycles are implemented with a phase offset with respect to one another. Filter materials which satisfy the requirements with regard to compressive strength and temperature resistance are for example the metallic filtration fabrics described in DE102012216084, sintered metal and sintered plastic. The described robust materials are available only in a flat or plate-like structure and not in the required size or dimensions. Mechanical processing into other geometrical shapes, such as for example half-shells, is not possible owing to the required filter fineness and the damage to or clogging of the porous filter structure that arises during mechanical processing.

From the special print from "Industriepumpen+Kompressoren" ["Industrial pumps and compressors"], 16th volume, book 3-2010, pages 120-123, Vulkan-Verlag Essen, with the title "Prozesspumpen mit zustandsüberwachter redundanter Schlauchmembran-Einspannung" ["Process pumps with state-monitored redundant hose diaphragm clamping"] by Heinz M. Nagel, a process pump is known, the double diaphragm of which is monitored with regard to integrity by means of coupling fluid and connection to a diaphragm rupture indicator.

SUMMARY OF THE INVENTION

The invention is based on the object of providing a filter element for feeding fluidizing and charging gas into the pressure vessel of a diaphragm pump, which filter element combines the requirements of pressure resistance, temperature resistance, adequate filter fineness, producibility with low outlay, and interaction with the diaphragm for the purposes of high diaphragm availability.

The object is achieved by means of a method for producing a gas-permeable aluminum body having the features according to one aspect of the invention, and by means of a gas-permeable aluminum body produced in accordance with said method, having the features according to another aspect of the invention.

The invention utilizes the realization that, for the mode of operation of the diaphragm pump, a uniformly distributed feed of the fluidizing gas in the lower region of the dust pump is essential. In the case of the loosening element produced in accordance with the invention, it is ensured that, by means of processing to form a domed filter element with a 3-dimensional shaping, any clogging of the material is avoided, and a uniform porosity can be realized.

The loosening element produced in accordance with the invention has a constant porosity, whereby it can be ensured that superfine dust particles do not ingress into the loosening surface during the expansion process of the dust chamber, giving rise to a uniformly distributed feed of fluidizing gas into the dust chamber during the charging process.

The invention permits a structural design of the dust chamber with a contour which is adapted in a particularly advantageous manner to the deflection of the diaphragm and possibly to the guide rod of the diaphragm. In this way, a uniform and reversible deformation of the diaphragm with the least possible wear is achieved.

After the completion of the conveying-out process of the diaphragm pump, it can be achieved that the diaphragm 3 lies substantially areally against the half-shell-shaped loosening surface 5. By means of this advantageous embodiment, a small dead volume can be achieved, which leads to a minimal dust chamber volume 10 with a simultaneously high conveying rate and low losses of high-pressure gas.

In the case of a hydraulically driven diaphragm pump for the pneumatic high-pressure conveyance of fluidized dusts, which diaphragm pump is equipped with the filter element produced in accordance with the invention, the pressure vessel that encloses the dust chamber has small dimensions with a minimized wall thickness, which leads to a reduction in production outlay.

In one particular embodiment of the invention, the loosening surface 5 has, at the lowest point, a circular opening to which there is fastened a dust pipe 7 through which the material for conveying in dust form can be conveyed in and conveyed out, which material for conveying thus cannot pass into the gas chamber 13.

Advantageous refinements of the invention are discussed below.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

The sole FIGURE shows a diaphragm pump in accordance with the invention.

DETAILED DESCRIPTION OF PREFERRED EMBODIMENTS

The invention will be discussed in more detail below in an exemplary embodiment, to an extent required for the purposes of understanding, on the basis of the sole FIGURE.

The diaphragm pump illustrated in the sole FIGURE is an apparatus composed of two pressure-resistant half-shells 1, 12 which are connected to one another in gas-tight fashion by means of a flange connection 2. The flange connection has, aside from the possibility of easy disassembly of the dust pump, the additional function of fastening and clamping the diaphragm 3 and the loosening surface 5 by means of a filter flange 4. By means of the spherical geometry, it is thus possible for an advantageous deflection, which conserves the filter material, of the diaphragm into the dust chamber in the form of a paraboloid of revolution to be realized. The deflection of the diaphragm is in this case caused by an action of force of the hydraulic liquid, as described for example in DE102016201182. Abrupt changes are avoided, and after the completion of the conveying-out process, it can be achieved that the diaphragm 3 lies substantially areally against the half-shell-shaped loosening surface 5. By means of this advantageous embodiment, a small dead volume can be achieved, which leads to a minimal dust chamber volume 10 with a simultaneously high conveying rate and low losses of high-pressure gas. To avoid undesired movements and folding during the conveying-out process, the diaphragm is guided and stabilized in terms of its movement by means of a guide rod 9. The guide rod may, in a particularly advantageous embodiment, perform additional tasks such as for example the determination of the position of the diaphragm by means of measuring position transducers.

The invention is furthermore based on the problem of generating dense-stream conveying, described in DE 102005047583, by generating a fluidized bed within the dust chamber. This is achieved during the charging and conveying-out process by means of a homogeneous feed of gas via a half-shell-shaped and gas-permeable loosening surface 5. As filter material for the loosening surface 5, use is made of porous metal, for example aluminum, with an adequately small pore size and filter fineness of <20 μm. It can thus be ensured that superfine dust particles do not ingress into the loosening surface during the expansion process.

For the production of porous metal, liquid metal, for example aluminum, together with granulated salt is cast into a half-shell mold. Salt has a significantly higher melting point for example in relation to metals such as aluminum, and does not change into the liquid state of aggregation, but rather distributes uniformly in the melt. After solidification of the metal, the salt is washed out by means of a salt-dissolving liquid, and porous and gas-permeable metal is formed. An advantage of this method consists in the possibility of performing mechanical processing prior to the washing-out of the salt crystals. In this way, clogging of the pores is ruled out. The required porosity and filter fineness is set by means of the size of the salt grains.

In order to realize an advantageous flange seal 2, the loosening surface 5 may be formed in two layers; as a porous metal in the lower region and as a solid material in the flange region.

In a particular embodiment of the invention, the half-shell-shaped casting mold of the loosening surface 5 is expanded to include additional ring-shaped and/or punctiform support elements 8. It is thus possible for the half-shell-shaped loosening surface 5 composed of porous metal to be fitted and fastened into the lower pressure-resistant half-shell 12 composed of solid material. A gas chamber 13 is advantageously formed between the loosening surface composed of porous metal and the pressure-resistant half-shell, which gas chamber can be used for the distribution of the loosening and charging gas. The feed and discharge of the loosening and charging gas is realized by openings 6 in the lower pressure-resistant half-shell 12.

In the case of a hydraulically driven diaphragm pump for pneumatic high-pressure conveying of fluidized dusts, the reliable sealing of the dust chamber from the hydraulic chamber, which are separated by means of the diaphragm, is of particular importance. The deflection of the diaphragm and the associated drawing-in and conveying-out of the material for conveying in dust form is achieved by virtue of the hydraulic fluid in the hydraulic chamber situated above the diaphragm being forced in and forced out. Within this conveying process, the ingress of dust into the hydraulic liquid or of hydraulic liquid into the dust chamber is associated with considerable plant malfunctions and would lead to cumbersome repairs.

One special feature of the invention consists in the monitoring and assurance of the diaphragm leak-tightness. For this purpose, the diaphragm 3 is designed as a double diaphragm with integrated pressure sensor for leakage monitoring. In this way, it is possible for a hermetically sealed separation between hydraulic chamber 11 and dust chamber 10 to be ensured, and damage to the diaphragm can be identified in good time. Cumbersome repair and cleaning measures of the entire dust system or hydraulics system in the event of diaphragm damage are avoided, and the leak-tightness of the diaphragm is maintained during the fault situation.

In the case of the diaphragm 3 being designed as a double diaphragm, two resiliently elastic diaphragms are arranged so as to be mechanically supported relative to one another such that a closed intermediate space is formed between the diaphragms, which intermediate space can be monitored by means of a pressure sensor $\Delta p$ 14. During fault-free operation, the intermediate space has a pressure lower than the pressure in the hydraulics chamber or the dust chamber. If a pressure increase is now detected in the intermediate chamber, a leakage of one of the two diaphragms of the double diaphragm is inferred. The two diaphragms may be arranged so as to be mechanically supported relative to one another in punctiform fashion by virtue of a layer of balls being arranged between them. The two diaphragms may be arranged so as to be mechanically supported relative to one another by virtue of a coupling liquid being introduced between them, which coupling liquid is operatively connected to the pressure sensor $\Delta p$.

The resiliently elastic diaphragm may be formed with an elastomer or a solid PTFE mixture. In the case of the double diaphragm, one of the two diaphragms may be realized by means of an elastomer, and the other of the two diaphragms may be realized by means of a solid PTFE mixture.

The invention is also provided by means of a diaphragm pump for fluidizing and conveying dusts, in the case of which the pressure-resistant housing of the dust pump is composed of two half-shells which are connected by means of a flange connection and into which a diaphragm and a loosening surface are flange-mounted, the loosening surface is formed in layers from porous material in the lower region and solid material in the region of the flange connection, the loosening surface is designed as a half-shell and comprises support elements, and a gas chamber exists between pressure-resistant lower half-shell and loosening surface.

The present invention has been discussed in detail for illustrative purposes on the basis of specific exemplary embodiments. Here, elements of the individual exemplary embodiments may also be combined with one another. The invention is therefore intended not to be restricted to individual exemplary embodiments, but rather restricted only by the appended claims.

Although only a few embodiments of the present invention have been shown and described, it is to be understood that many changes and modifications may be made thereunto without departing from the spirit and scope of the invention.

LIST OF REFERENCE DESIGNATIONS

1 Pressure-resistant upper half-shell, hydraulics half-shell
2 Container flange
3 Diaphragm
4 Filter flange
5 Loosening surface composed of porous metallic filter material
6 Openings for charging and conveying gas, gas pipe
7 Inner pipe for inlet and outlet of the dust, dust pipe
8 Ring-shaped, punctiform, strip-shaped support elements
9 Diaphragm guide/guide rod
10 Dust chamber
11 Hydraulics chamber
12 Pressure-resistant lower half-shell, dust half-shell
13 Gas chamber
14 Pressure sensor $\Delta p$

What is claimed is:

1. A diaphragm pump for fluidizing and conveying dusts, wherein a pressure-resistant housing of the diaphragm pump is composed of two half-shells which are connected by means of a flange connection and into which a diaphragm and a loosening surface for feeding fluidizing and charging gas into a pressure vessel of the diaphragm pump are flanged, and wherein a homogeneous feed of gas via the half-shell-shaped and gas-permeable loosening surface is provided and wherein porous metal with an adequately small pore size and filter fineness <20 µm is used for a filter material for the half-shell-shaped and gas-permeable loosening surface.

2. The diaphragm pump according to claim 1, wherein the half-shell-shaped and gas-permeable loosening surface has, at the lowest point, a circular opening to which there is fastened a dust pipe.

3. The diaphragm pump according to claim 1, wherein at least one support is formed onto the half-shell-shaped and gas-permeable loosening surface.

4. The diaphragm pump according to claim 2, wherein at least one support is formed onto the half-shell-shaped and gas-permeable loosening surface.

* * * * *